(12) United States Patent
Schwaab et al.

(10) Patent No.: US 11,346,294 B2
(45) Date of Patent: May 31, 2022

(54) METHOD FOR OPERATING AN INTERNAL COMBUSTION ENGINE OF A MOTOR VEHICLE AND ARRANGEMENT OF A PARTICULATE FILTER IN AN EXHAUST SYSTEM OF A MOTOR VEHICLE

(71) Applicant: Daimler AG, Stuttgart (DE)

(72) Inventors: Julius Schwaab, Stuttgart (DE); Peter Lanzerath, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/629,103

(22) PCT Filed: Jun. 12, 2018

(86) PCT No.: PCT/EP2018/065415
§ 371 (c)(1),
(2) Date: Jan. 7, 2020

(87) PCT Pub. No.: WO2019/011545
PCT Pub. Date: Jan. 17, 2019

(65) Prior Publication Data
US 2020/0191079 A1   Jun. 18, 2020

(30) Foreign Application Priority Data
Jul. 8, 2017   (DE) .................. 10 2017 006 501.2

(51) Int. Cl.
*F01N 3/00*   (2006.01)
*F02D 41/02*   (2006.01)
(Continued)

(52) U.S. Cl.
CPC ........... *F02D 41/024* (2013.01); *F01N 3/023* (2013.01); *F01N 9/002* (2013.01);
(Continued)

(58) Field of Classification Search
CPC ................. F02D 41/02; F02D 41/123; F02D 2200/0812; F01N 3/023; F01N 9/002;
(Continued)

(56) References Cited

U.S. PATENT DOCUMENTS 7,587,892 B2   9/2009   Dye et al.
9,328,645 B2 *   5/2016   Tylutki .................... F01N 3/103
(Continued)

FOREIGN PATENT DOCUMENTS

CN   108798833 A   * 11/2018   ............. F01N 11/00
DE   102004025436 A1 * 12/2005   ............ F01N 11/002
(Continued)

OTHER PUBLICATIONS

International Search Report (PCT/ISA/210) issued in PCT Application No. PCT/EP2018/065415 dated Aug. 31, 2018 with English translation (seven pages).

(Continued)

*Primary Examiner* — Matthew T Largi
(74) *Attorney, Agent, or Firm* — Crowell & Moring LLP (57) ABSTRACT

In a method for operating an internal combustion engine of a motor vehicle, exhaust gas from the internal combustion engine is fed to a particulate filter of the motor vehicle. Until a predetermined filtration rate of the particulate filter is reached, a temporary interruption of a fuel supply to the internal combustion engine is prevented in an overrun mode of the motor vehicle if a temperature of the exhaust gas in the particulate filter is greater than a predetermined threshold value of the temperature. An arrangement of the particulate filter in an exhaust system of the motor vehicle is also described.

7 Claims, 4 Drawing Sheets

(51) Int. Cl.
  *F01N 3/023* (2006.01)
  *F01N 9/00* (2006.01)
  *F02D 41/12* (2006.01)

(52) U.S. Cl.
  CPC ............... *F01N 2900/1602* (2013.01); *F01N 2900/1606* (2013.01); *F01N 2900/1611* (2013.01); *F02D 41/123* (2013.01); *F02D 2200/0812* (2013.01)

(58) Field of Classification Search
  CPC ..... F01N 2900/1602; F01N 2900/1606; F01N 2900/1611
  See application file for complete search history.

(56) References Cited

U.S. PATENT DOCUMENTS

| | | | | |
|---|---|---|---|---|
| 2003/0057581 | A1* | 3/2003 | Lu | C04B 35/584 264/30 |
| 2010/0205942 | A1* | 8/2010 | Fujiwara | F02D 41/029 60/285 |
| 2015/0369153 | A1* | 12/2015 | Tsu | F02D 41/123 60/285 |
| 2016/0222898 | A1 | 8/2016 | Ulrey et al. | |
| 2017/0101916 | A1* | 4/2017 | Klaas | F01N 9/005 |
| 2018/0298799 | A1* | 10/2018 | Wessels | F01N 13/0097 |

FOREIGN PATENT DOCUMENTS

| | | | |
|---|---|---|---|
| DE | 10 2012 021 882 A1 | 5/2014 | |
| DE | 102012021882 A1 * | 5/2014 | ......... F02D 41/0235 |
| DE | 10 2014 205 685 A1 | 10/2015 | |
| DE | 10 2014 006 692 A1 | 11/2015 | |
| DE | 10 2016 101 105 A1 | 8/2016 | |
| DE | 10 2015 211 570 A1 | 12/2016 | |
| WO | WO 2014/207023 A1 | 12/2014 | |

OTHER PUBLICATIONS

German-language Written Opinion (PCT/ISA/237) issued in PCT Application No. PCT/EP2018/065415 dated Aug. 31, 2018 (five pages).

German-language Search Report issued in counterpart German Application No. 10 2017 006 501.2 dated Mar. 14, 2018 with partial English translation (15 pages).

Hoeffken, "Untersuchungen zur Durchstroemung, Beladung und Regeneration eines Diesel-Partikelfilters", Jan. 1, 2009, XP055501246, 162 pages.

* cited by examiner

METHOD FOR OPERATING AN INTERNAL COMBUSTION ENGINE OF A MOTOR VEHICLE AND ARRANGEMENT OF A PARTICULATE FILTER IN AN EXHAUST SYSTEM OF A MOTOR VEHICLE

The present invention relates to a method for operating an internal combustion engine of a motor vehicle in which exhaust gas from the internal combustion engine is fed to a particulate filter of the motor vehicle. Further, the invention relates to an arrangement of a particulate filter in an exhaust system of a motor vehicle.

German Publication DE 10 2014 006 692 A1 describes a regeneration strategy for a particulate filter in the case of an internal combustion engine of a vehicle functioning according to the Otto principle. At least three different regeneration strategies are tested in this regard, and one of these regeneration strategies is selected. The regeneration strategies comprise an overrun cut-off. This involves switching off an injection during overrun phases of the vehicle so that there is sufficient oxygen in the particulate filter to carry out the combustion. This assumes that there is also a sufficient temperature in the particulate filter to ignite the soot retained in the particulate filter. The regeneration of a particulate filter in overrun phases leads to a reduction in the filtration rate of the particulate filter.

The filtration rate, i.e. the ability of the particulate filter to retain a certain proportion of the number of particles contained in the exhaust gas in the particulate filter, increases during operation of the internal combustion engine or vehicle. This is due to the loading of the particulate filter with ash contained in the exhaust gas, in particular oil ash. The oil ash is an inorganic component contained in the engine oil used to lubricate the internal combustion engine. However, the effect of the increasing filtration rate is also intensified by the additional loading of the particulate filter with soot particles. In contrast to ash components, however, soot components on the particulate filter can be oxidized during regeneration of the particulate filter. The increase in the filtration rate caused by the accumulation of soot on the particulate filter is therefore reversible.

It is the object of the present invention to create a method and an arrangement of the type mentioned above, by means of which an improved filtration performance of the particulate filter can be achieved.

This object is achieved by a method and an arrangement having features claimed. Advantageous designs with appropriate developments of the invention are specified in the dependent claims.

In the method for operating an internal combustion engine of a motor vehicle according to the invention, exhaust gas from the internal combustion engine is fed to a particulate filter of the motor vehicle. Until a predetermined filtration rate of the particulate filter is reached, a temporary interruption of a fuel supply to the internal combustion engine is prevented in an overrun mode of the motor vehicle. The prevention occurs when a temperature of the exhaust gas in the particulate filter is greater than a predetermined temperature threshold. The method allows the filtration rate of the particulate filter to be increased by maintaining unavoidable particle emissions on the particulate filter as a result of the operation of the internal combustion engine. This is done by preventing the temporary interruption of the fuel supply to the internal combustion engine during overrun mode of the vehicle, i.e. by preventing overrun cut-off. The overrun cut-off is not carried out if the temperature of the exhaust gas in the particulate filter is higher than the predetermined threshold value.

Increasing the filtration rate and thus improving the filtration performance is therefore achieved by a targeted avoidance of the regeneration of the filter, which would otherwise take place in the form of an overrun cut-off. This is based on the knowledge that the regeneration of the particulate filter can only take place if the exhaust gas or the particulate filter has a sufficiently high temperature at which the soot particles retained by the particulate filter can be oxidised.

In the case of overrun cut-off, exhaust gas with a high oxygen content is fed to the particulate filter through the engine, e.g. an internal combustion engine, which is towed by the vehicle mass in motion. If the high temperature of the particulate filter is also present, the soot particles will burn off. In the present case, however, if the particulate filter has a component temperature above the predetermined threshold value, the particulate filter is not exposed to exhaust gas with a high oxygen content. The soot load on the particulate filter therefore remains until the desired or predetermined filtration rate of the particulate filter is reached. The process thus offers the advantage of increased filtration efficiency of the particulate filter during operation.

However, the proportion of ash deposited on the particulate filter, in particular oil ash, rises continuously. Therefore, as the operating time or running time of the particulate filter increases, an increasingly large proportion of the soot mass on the particulate filter can be oxidized without causing an undesirably sharp drop in the filtration rate of the particulate filter.

In principle, it is conceivable that, to increase the filtration rate of a particulate filter, the filter is designed in such a way that it has a particularly low wall porosity. However, such a reduction in permeability is accompanied by an increase in the counterpressure of an exhaust system in which the particulate filter is arranged. In the present case, however, the advantage of increased filtration efficiency can be achieved without the disadvantage of an increased counterpressure of the exhaust system due to the design of the particulate filter. A particulate filter can thus be used which has a comparatively high permeability when in new condition. Nevertheless, a high filtration rate can be achieved comparatively quickly after the start of the service life.

In general, it is advisable to keep the soot load of the particulate filter as low as possible in order to keep the counterpressure of the exhaust system as low as possible. In order to increase the filtration rate of the particulate filter, in particular with regard to the number of particles, it is sensible to obtain a possible soot load on the particulate filter, in particular in the initial phase of the component life, i.e. at the beginning of the life of the particulate filter.

In particular, the current temperature of the particulate filter is therefore evaluated in the case of a demand for overrun cut-off, i.e. a demand for temporary interruption of the fuel supply to the internal combustion engine during thrust operation of the motor vehicle. If the temperature is too high, the overrun cut-off is prevented and instead fuel is introduced into the combustion chambers of the respective cylinders of the internal combustion engine during overrun mode of the motor vehicle.

The interruption of the fuel supply can be prevented by operating the internal combustion engine at a combustion air ratio where there is a lack of air. With such a combustion ratio of $\lambda<1$, it is particularly safe to prevent the particulate filter from being subjected to oxygen-containing exhaust gas in such a way that it results in the oxidation of the soot on the particulate filter.

Alternatively, the interruption of the fuel supply can be prevented by operating the internal combustion engine with a stoichiometric combustion air ratio ($\lambda=1$). This also largely prevents the particulate filter from being exposed to oxygen-containing exhaust gas. In addition, the emissions of the motor vehicle can be kept particularly low in this way.

A value of at least 475 degrees Celsius is preferably used as the predetermined temperature threshold. This is based on the knowledge that, up to a temperature of 475 degrees Celsius in the particulate filter, even if the particulate filter is exposed to oxygen-containing exhaust gas, soot in the particulate filter hardly burns at all.

In particular, a value of at least 500 degrees Celsius may be used as the predetermined temperature threshold. This is because, even at temperatures of the particulate filter of less than 500 degrees Celsius, the only result is a low and therefore tolerable combustion of soot particles in the particulate filter as a result of the particulate filter being exposed to oxygen-containing exhaust gas. However, the use of the temperature threshold of at least 500 degrees Celsius is accompanied by a particularly low fuel consumption of the internal combustion engine. This is because the overrun cut-off can be carried out more frequently.

Preferably, a filtration rate of at least 90 percent relative to a number of particles is used as the predetermined filtration rate of the particulate filter.

An even higher filtration efficiency can be achieved when a filtration rate of approximately 95 percent based on the number of particles is used as the predetermined filtration rate of the particulate filter. This is associated with increased fuel consumption. However, even with internal combustion engines which are unfavourable in terms of particle emissions, it is easier to ensure compliance with limit values, in particular under real driving conditions.

Preferably, the filtration rate is determined depending on a loading of the particulate filter with ash and soot. This is because the loading of the particulate filter with ash and soot is easy to determine, and the filtration rate can easily be derived from the loading. By way of example, the filtration rate can be determined on a test bench as a function of the ash and soot load for the respective particulate filter. The loading of the particulate filter can be determined by weighing, and the filtration rate can be determined by measuring the number of particles in the exhaust upstream of the particulate filter and downstream of the particulate filter. This makes it easy to establish a correlation between the respective ash and soot load on the particulate filter and the filtration rate.

Preferably, a pressure difference across the particulate filter and a volume flow of the exhaust gas are used to determine the soot loading of the particulate filter. The pressure difference, i.e. the difference between the pressure in the exhaust gas upstream of the particulate filter and downstream of the particulate filter, can be measured easily. The exhaust gas volume flow, on the other hand, can easily be determined from the exhaust gas mass flow and the gas density or temperature of the exhaust gas in the particulate filter. The corresponding quantities such as the exhaust gas mass flow and the exhaust gas temperature can be measured and/or determined using a model. Accordingly, the soot load of the particulate filter can be determined very easily in this way.

When determining the pressure difference, the proportion of the differential pressure or pressure drop caused by the resistance of the particulate filter not yet loaded is preferably taken into account in order to obtain the pressure increase due to the loading of the particulate filter with soot. A proportion of the load attributable to the ash can be recorded cumulatively, in particular by means of a model based on the fuel consumption of the internal combustion engine and the operating hours of the internal combustion engine. The soot proportion is then the proportion missing from the total load.

Preferably, a filter is used as the particulate filter, which has a filtration rate in new condition of about 70 percent relative to a particle number. With such a particulate filter, the counterpressure of the exhaust system caused by the particulate filter is comparatively low even after the storage of ash in the particulate filter, which increases the filtration rate, over a very long period of the entire service life of the particulate filter.

In particular, the internal combustion engine is operated as a petrol engine and the particulate filter as a petrol particulate filter. In particular in the case of a petrol particulate filter, regeneration can easily be achieved by overrun cut-off. Since in the present case, such overrun cut-off is prevented at the beginning of the service life of the particulate filter, i.e. until the predetermined filtration rate is reached, the method is particularly advantageous in the case of internal combustion engines operated as petrol engines and particulate filters operated as petrol particulate filters.

When a particulate filter is arranged in an exhaust system of a motor vehicle in accordance with the invention, the particulate filter can be exposed to exhaust gas from an internal combustion engine of the motor vehicle. The arrangement comprises a control device which is designed to prevent a temporary interruption of a fuel supply to the internal combustion engine until a predetermined filtration rate of the particulate filter is reached in an overrun mode of the motor vehicle. The control device is designed to prevent the interruption of the fuel supply if a temperature of the exhaust gas in the particulate filter is greater than a predetermined threshold value of the temperature. Accordingly, the control device is designed to carry out the method according to the invention. By means of the arrangement, an improved filtration performance of the particulate filter can be achieved.

The advantages and preferred embodiments described for the method according to the invention also apply to the arrangement according to the invention and vice versa.

Further advantages, features and details of the invention result from the following description of preferred exemplary embodiments as well as from the drawings. The features and combinations of features mentioned above in the description and the features and combinations of features mentioned below in the figure description and/or shown just in the figures can be used not only in the combination indicated in each case, but also in other combinations or in a unique position without leaving the scope of the invention.

DETAILED DESCRIPTION OF THE INVENTION

Figure 1:
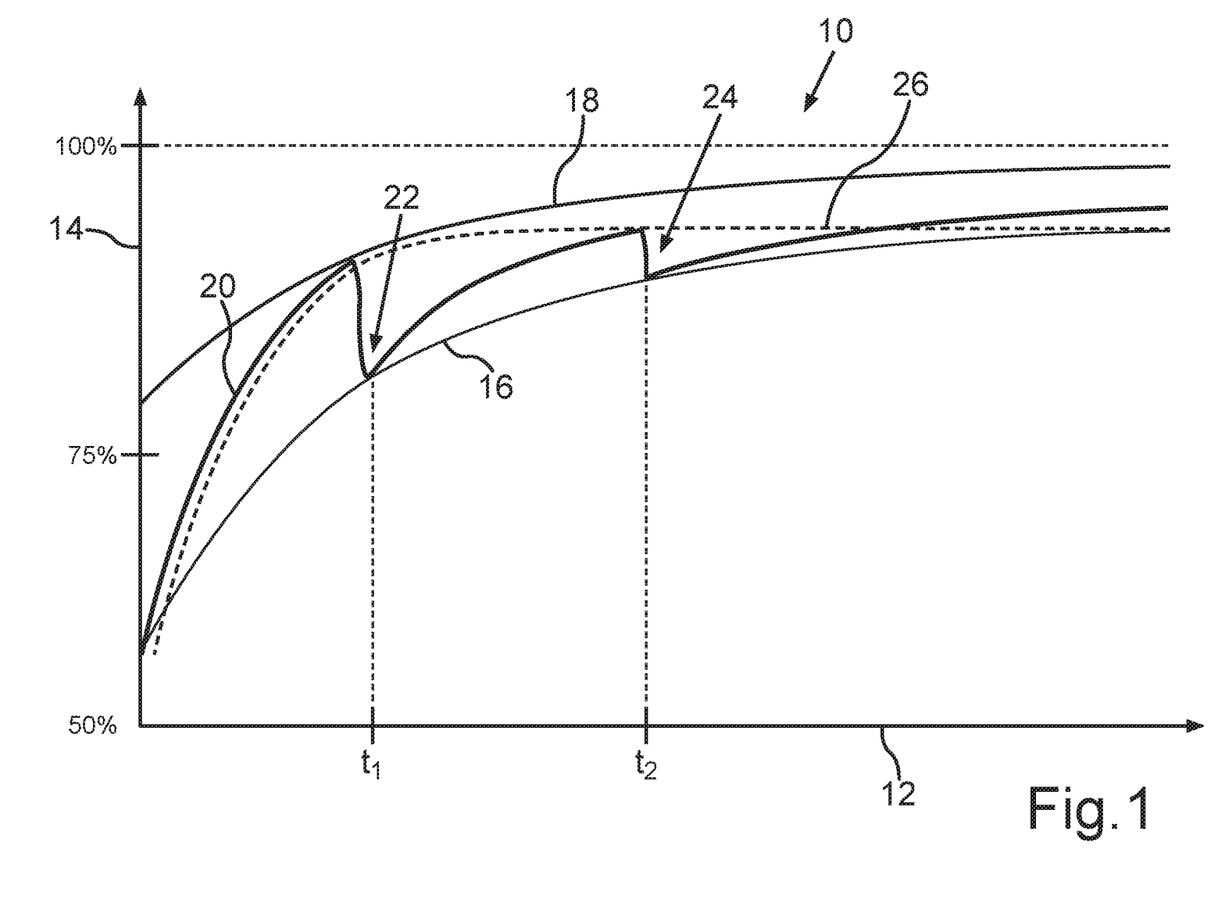
FIG. 1 is a graph in which different modes of operation of particulate filters are illustrated at the beginning of the running time thereof, wherein the influence of two regenerations on the filtration rate of one of the particulate filters is illustrated.
Figure 4:
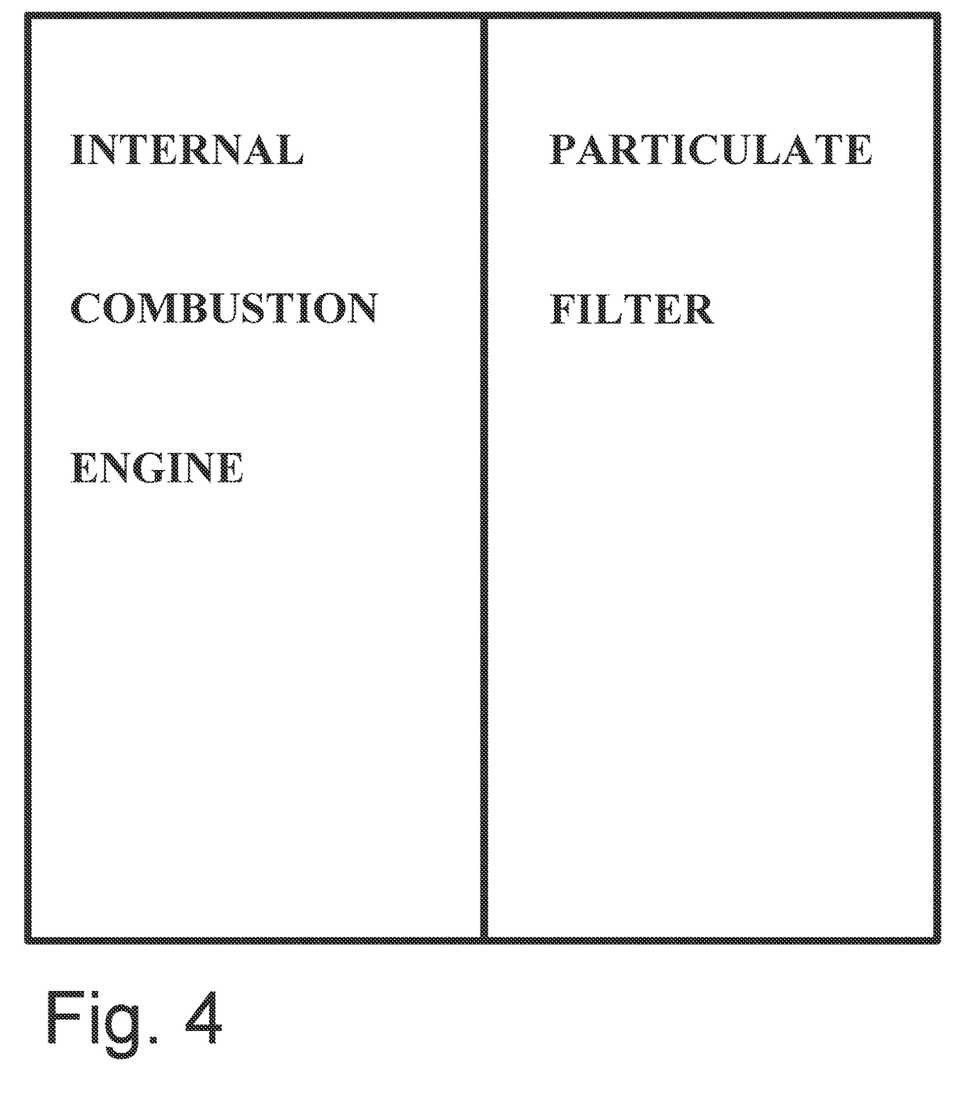
FIG. 4 is a schematic representation of an internal combustion engine that is pressurized with exhaust gas from a particulate filter.

In FIG. 1, on a graph 10, the service life of a particulate filter is plotted on a time axis 12. The particulate filter (FIG. 4) is preferably a petrol particulate filter, i.e. a particulate filter which is pressurised with exhaust gas from an internal combustion engine (FIG. 4) of a motor vehicle designed as a petrol engine. In the graph 10, a filtration rate 14 of the particulate filter is specified on an ordinate in percent. The filtration rate 14 refers here to the number of particles which are filtered out of the exhaust gas of the internal combustion engine by means of a particulate filter arranged in an exhaust system of the motor vehicle.

A first curve 16 in graph 10 illustrates the increase in the filtration rate 14 for a particulate filter with an initial, comparatively high permeability or high wall porosity. It can be recognized that over the service life of the particulate filter, the filtration rate 14 initially rises comparatively strongly and then increasingly slowly. The increase in the filtration rate 14 according to curve 16 is due to the loading of the particulate filter with the oil ash contained in the exhaust gas. A further curve 18 illustrates the conditions for a particulate filter with lower permeability or lower wall porosity. Accordingly, the original filtration rate 14 for this particulate filter is already greater than for the particulate filter illustrated in curve 16.

The filtration rate 14 of a particulate filter is also increased by an additional loading of the particulate filter with soot particles. In contrast to ash components, soot components on the particulate filter can be oxidized during regeneration. This is illustrated in FIG. 1 by a further curve 20. Due to the loading with soot particles, the filtration rate 14 initially rises sharply. In a first regeneration phase $t_1$, however, a regeneration of the particulate filter takes place, which is caused in the present instance by an overrun cut-off. In the case of overrun cut-off, the fuel supply to the internal combustion engine is temporarily or momentarily interrupted during overrun mode of the vehicle equipped with the particulate filter. This occurs while the temperature of the particulate filter is sufficiently high to allow oxidation of the soot. At this high temperature, the particulate filter is exposed to oxygen-containing exhaust gas and it results in soot combustion. This is noticeable by a drop 22 in curve 20 during the first regeneration phase $t_1$. After a renewed increase in the filtration rate 14, a renewed drop 24 of curve 20 occurs in a second regeneration phase $t_2$.

A further curve 26, which is shown in graph 10 in FIG. 1, is intended to illustrate a method in which regeneration by the overrun cut-off is dispensed with at the beginning of the service life of the particulate filter. By means of this method, the filtration rate 14 of the petrol particulate filter can be increased at the beginning of the component life.

This ensures that the particulate emissions, which are unavoidable during operation of the internal combustion engine, are preserved on the particulate filter. The regeneration of the particulate filter by the overrun cut-offs according to curve 20 takes place above a temperature threshold. The method now ensures that if the particulate filter has a temperature above this temperature threshold, the particulate filter is not exposed to oxygen-containing exhaust gas, as occurs within the framework of an overrun cut-off. Consequently, curve 26 shows a steady increase in the filtration rate 14. This is because no regeneration of the particulate filter takes place by overrun cut-offs if the temperature of the particulate filter is so high that soot combustion could occur during an overrun cut-off.

In particular at the beginning of the service life of the particulate filter, the entire soot mass is preserved in this way on the particulate filter. Since the proportion of oil ash on the particulate filter also continuously increases, an increasing proportion of the soot mass on the particulate filter can be oxidised as the service life of the of the component or particulate filter increases. The curve 26 thus illustrates the increasing filtration rate 14 in the case of a particulate filter having a permeability in its initial state which corresponds to that of the particulate filter illustrated by curve 16. However, with this type of filter, an intervention is made by avoiding soot oxidations, which are caused by the overrun cut-offs in the particulate filter according to the curve 20.

Figure 2:
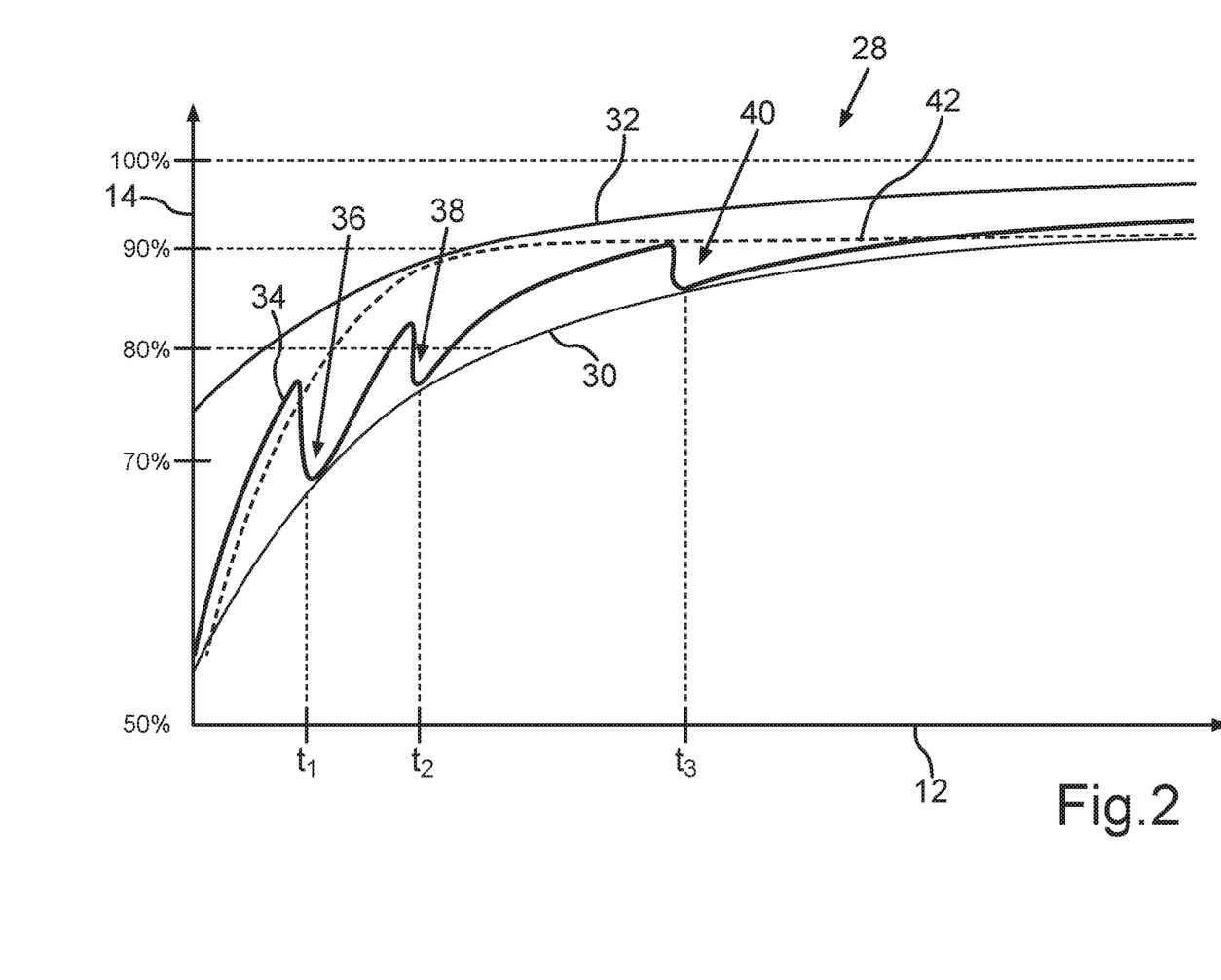
FIG. 2 is a graph in which different modes of operation of particulate filters are illustrated at the beginning of the running time thereof, wherein the influence of three regenerations on the filtration rate of one of the particulate filters is illustrated.

On the basis of FIG. 2, another graph 28 is intended to clarify the method again, wherein a total of three regeneration phases with passive soot oxidation are avoided here. In turn, the time axis 12 and the filtration rate 14 applied to the ordinate are shown in the graph 28. Furthermore, a curve 30 again illustrates the increase of the filtration rate 14 over the service life of a petrol particulate filter with a comparatively high permeability in its initial state. A further curve 32 illustrates the filtration rate 14 of a petrol particulate filter over the running time, which has a lower permeability.

The filtration rate 14 of both particulate filters increases over the service life due to the continuous introduction of non-regenerable oil ashes. The filtration rate 14 reaches about 100 percent over the entire service life of the particulate filters. However, the particulate filter illustrated by curve 30 only achieves an exemplarily chosen filtration rate of 80 percent later than the filter illustrated in curve 32, which already has a lower wall porosity when in new condition.

However, the increase in the filtration rate 14 is not only due to the deposition of the inorganic oil ash with increasing mileage of the particulate filter. Rather, the soot mass retained in the particulate filter also leads to an increase in the filtration rate 14. This is illustrated by a further curve 34 in the case of the particulate filter illustrated by curve 30 in FIG. 2. If, however, the availability of oxygen at the particulate filter is not prevented if the particulate filter has a temperature above the threshold value, the result is the curve progression shown by curve 34. By way of example, due to soot oxidations, which are carried out within three respective regeneration phases $t_1$, $t_2$, $t_3$, in which the combustion engine is operated in overrun mode, a respective reduction 36, 38, 40 of the filtration rate 14 occurs. Accordingly, it takes comparatively long until the filtration rate 14 has reached a value of, for example, 90 percent.

However, by avoiding the oxidation of soot on the particulate filter for a certain period of time, it is possible to ensure that the soot on the particulate filter remains intact. This is illustrated by another curve 42 in graph 28. The regeneration of the particulate filter can only take place above the temperature threshold. In the mode of operation of the particulate filter illustrated by curve 42, the introduction of oxygen-containing exhaust gas into the particulate filter is avoided. However, this only happens if the temperature of the particulate filter is above the threshold value of the temperature above which soot oxidation occurs in the presence of oxygen. The total soot mass produced since the internal combustion engine was first started thus remains on the particulate filter illustrated in curve 42 until a desired filtration rate 14, for example a filtration rate 14 of 90 percent, is achieved.

In order to record the loading of the particulate filter with soot and ash, a differential pressure measurement can, for example, be carried out on the particulate filter. In addition, the volume flow of the exhaust gas is preferably used to determine the loading of the particulate filter.

However, the mass of non-regenerable oil ash on the particulate filter also increases continuously. Therefore, as the service life of the component increases, an increasing proportion of soot on the particulate filter can be released for oxidation. However, by avoiding the availability of oxygen at the particulate filter by the method described above, the progression of the filtration rate 14 shown in curve 42 is obtained. From a certain mileage onwards, the particulate filter illustrated in curve 42 achieves the desired or predetermined filtration rate 14 of 90 percent. However, the particulate filter illustrated in curve 42 does not have the disadvantage with regard to the exhaust gas counterpressure of the particulate filter illustrated in curve 32.

Thus the current temperature of the particulate filter, which can be measured or obtained by a model, is evaluated in case of a demand for an overrun cut-off. Further input parameters are the soot load and the ash load of the particulate filter. If the temperature of the particulate filter is too high, i.e. higher than the predetermined threshold value, the overrun cut-off is avoided and the internal combustion engine is preferably operated with a stoichiometric combustion air ratio.

In contrast to a method in which an overrun cut-off prohibition takes place in order to protect the particulate filter when the particulate filter is overloaded with soot, the present method takes into account the loading of the particulate filter with soot and ash. This is done in order to prevent the particulate filter from being undercharged with soot and ash to reduce the filtration rate 14 of the particulate filter. Once a certain minimum loading of the particulate filter with ash has been reached, soot oxidation is no longer prevented.

In the present case, no active intervention is made in the engine combustion at the beginning of the service life of the particulate filter in order to further increase the raw soot emissions of the internal combustion engine. However, if compliance with statutory emission limits can be achieved, such a change in combustion may be provided. This will allow the filtration rate 14 to be brought to the desired level even faster.

Due to the loading of the particulate filter with soot, the filtration rate 14 of the particulate filter increases comparatively rapidly. This is illustrated in FIG. 3.

Figure 3:
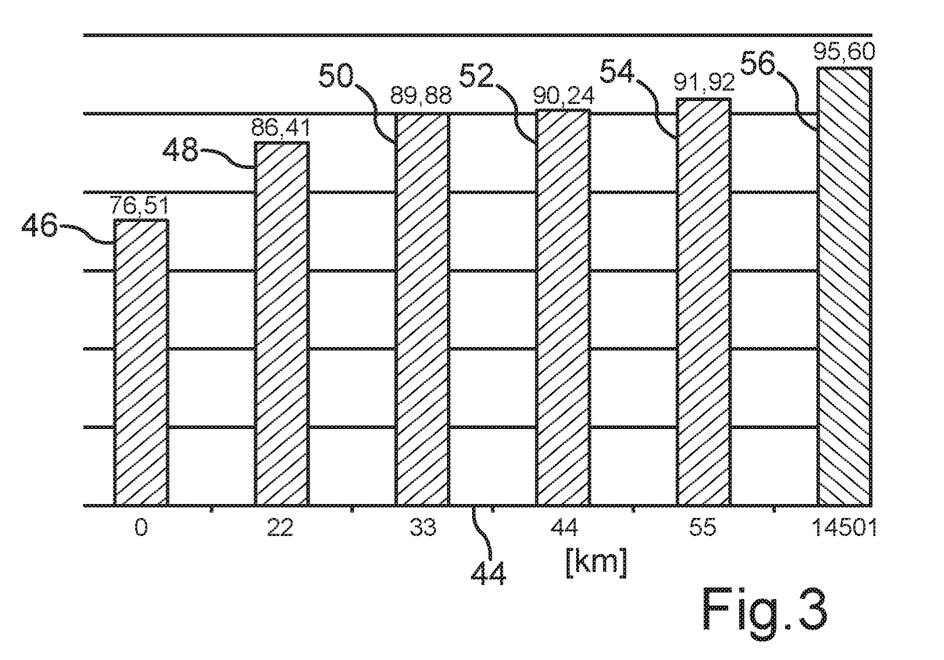
FIG. 3 shows exemplary filtration rates of particulate filters depending on the mileage in kilometers of a motor vehicle equipped with the particulate filter.

FIG. 3 shows the mileage in kilometers of the motor vehicle equipped with the internal combustion engine and the particulate filter on an abscissa 44. Respective bars 46, 48, 50, 52, 54 and 56 illustrate the filtration rate 14 for the respective mileage. Accordingly, it can be seen that after a mileage of about 50 kilometers, or at least after a mileage of about 100 kilometers, the particulate filter is loaded with soot to such an extent that it is no longer necessary in the meantime to stop the overrun cut-off.

By way of example, in the case of a mileage of 44 kilometers, a filtration rate 14 of over 90 percent was determined (bar 52) and in the case of a mileage of 55 kilometers, a filtration rate 14 of slightly more than 91 percent (bar 54). According to bar 56, in a case considered, the filtration rate 14 was over 95 percent for a mileage of more than 14,000 kilometers. However, at a mileage of 0 kilometers, the filtration rate 14 was already slightly more than 76 percent (bar 46). And at a mileage of 33 kilometers, the filtration rate 14 of the particulate filter already was slightly more than 89 percent (bar 50), while at a mileage of 22 kilometers, the filtration rate 14 of the particulate filter was slightly more than 86 percent (bar 48).

The increase of the filtration efficiency of the particulate filter is a combination of soot loading and ash loading. However, the increase in filtration efficiency due to the ash input into the particulate filter, in particular the petrol particle filter, is a long-term effect that cannot be observed after 100 kilometers. The increasing filtration efficiency with increasing mileage of the particulate filter, in particular the petrol particulate filter, is accompanied by a decrease in the number of particles contained in the exhaust gas per kilometer, which leaks from the exhaust system of the vehicle equipped with the particulate filter. The filtration efficiency of a petrol particulate filter, for example, increases comparatively rapidly, especially during the first 30,000 kilometers of mileage, and is almost 100 percent at 50,000 kilometers. At the same time, the number of particles per kilometer decreases by more than one order of magnitude within the first 30,000 kilometers.

The invention claimed is:

1. A method for operating an internal combustion engine of a motor vehicle, comprising:
   supplying exhaust gas from the internal combustion engine to a particulate filter of the motor vehicle,
   weighing the particulate filter to determine a loading of ash and soot for the particulate filter,
   determining a filtration rate of the particulate filter by measuring numbers of particles upstream and downstream of the particulate filter,
   establishing a correlation between the loading of the ash and soot for the particulate filter and the filtration rate of the particulate filter,
   preventing a temporary interruption of a fuel supply to the internal combustion engine if a temperature of the exhaust gas in the particulate filter is greater than a predetermined threshold value of the temperature until the particulate filter retains a certain proportion of particles contained in the exhaust gas in an overrun mode of the motor vehicle, the certain proportion being determined on a test bench and derived from the loading of the ash and soot, and
   providing the temporary interruption of the fuel supply when the temperature of the exhaust gas in the particulate filter is greater than said predetermined threshold value once the particulate filter retains the certain proportion of the particles.

2. The method according to claim 1, wherein the temporary interruption of the fuel supply is prevented by operating the internal combustion engine with a combustion air ratio at which there is a lack of air or with a stoichiometric combustion air ratio.

3. The method according to claim 1, wherein a value of at least 475 degrees Celsius is used as the predetermined threshold value of the temperature.

4. The method according to claim 1, wherein a value of at least 500 degrees Celsius is used as the predetermined threshold value of the temperature.

5. The method according to claim 1, wherein the certain proportion is at least 90 percent.

6. The method according to claim 5, wherein the certain proportion is at least 95 percent.

7. The method according to claim 1, wherein a filter that, when in new condition, has the certain proportion of particles be about 70 percent is used as the particulate filter.

* * * * *